United States Patent [19]

Kindler

[11] Patent Number: 4,493,398
[45] Date of Patent: Jan. 15, 1985

[54] DRIVE CONTROL FOR A TRANSPORTATION SYSTEM, ESPECIALLY AN ELEVATOR

[75] Inventor: Gerhard Kindler, Meggen, Switzerland

[73] Assignee: Inventio AG, Hergiswil, Switzerland

[21] Appl. No.: 490,779

[22] Filed: May 2, 1983

[30] Foreign Application Priority Data

May 3, 1982 [CH] Switzerland .................. 2688/82

[51] Int. Cl.³ .............................................. B66B 1/24
[52] U.S. Cl. ................................. 187/29 R; 318/268; 318/269; 318/270; 318/271
[58] Field of Search .............................. 187/29, 29 R; 318/268–271, 309, 310, 311, 326, 327

[56] References Cited

U.S. PATENT DOCUMENTS

| | | | |
|---|---|---|---|
| 2,958,796 | 11/1960 | Spiess et al. | 310/95 |
| 3,678,355 | 7/1972 | Bucek et al. | 318/203 R |
| 3,741,348 | 6/1973 | Caputo | 187/29 R |
| 3,908,156 | 9/1975 | Anzai et al. | 318/203 R |
| 4,034,856 | 7/1977 | Wehrli et al. | 187/29 R |
| 4,052,651 | 10/1977 | Kamaike | 318/230 |
| 4,072,212 | 2/1978 | Terazono et al. | 187/29 R |
| 4,102,436 | 7/1978 | Kernick et al. | 187/29 R |
| 4,213,517 | 7/1980 | Ando et al. | 187/29 R |
| 4,337,847 | 7/1982 | Schröder | 187/29 R |

FOREIGN PATENT DOCUMENTS 446492 3/1968 Switzerland .
525585 8/1972 Switzerland .

Primary Examiner—J. V. Truhe
Assistant Examiner—Paul Shik Luen Ip
Attorney, Agent, or Firm—Werner W. Kleeman

[57] ABSTRACT

In this drive control the regulating circuits for the rotational speed of a drive motor and of an eddy current brake are matched in their static and in their dynamic behavior so that a common regulator may be used for both regulating circuits. The matching is achieved by interposing a current regulation circuit for regulating the excitation current of the eddy current brake to the rotational speed regulating circuit. The output of the common regulator is supplied via a linearization member as a reference value to a regulator in the current regulation circuit during the deceleration phase. During the acceleration phase the output of the common regulator is supplied to a matching element matching the variation of the torque to the variation of the torque during the deceleration phase with respect to time. The output of the matching element is connected to the control member of the drive motor via a linearization member. By means of the linearization members the characteristics of a d.c.-shunt motor are approximately achievable. A distance regulating circuit is superposed on the rotational speed regulating circuit. The distance reference value is derived from jerk and acceleration magnitudes during the acceleration phase as well as during the deceleration phase, so that an optimum travel curve is achievable.

7 Claims, 12 Drawing Figures

DRIVE CONTROL FOR A TRANSPORTATION SYSTEM, ESPECIALLY AN ELEVATOR

BACKGROUND OF THE INVENTION

The present invention relates to a new and improved drive control for a transportation system, especially an elevator containing a drive or displacement motor coupled to an eddy current brake and to a tachometer. The drive control comprises a reference or set value transmitter and a regulator which is connected at its input side to the tachometer and at its output side to an adjustment or control member for controlling the driving torque of the drive motor as well as to an adjustment or control member for controlling the braking torque of the eddy current brake. The reference value transmitter generates an increasing reference or set value for the acceleration and a decreasing reference or set value for the deceleration. The travel course of the elevator is regulatable as a function of a regulation deviation which is supplied to the regulator and which is formed from the difference of the reference or set value and the actual value generated by the tachometer.

In a similarly conceived drive control as known, for example, from U.S. Pat. No. 2,828,832, granted Apr. 1, 1958, and the Canadian Pat. No. 579,898, the travel course is regulated only during the deceleration phase for the purpose of a precise direct approach while the other phases of travel of the elevator proceed without regulation. Upon initiating the deceleration phase the drive motor is turned off and the reference value transmitter is activated. The reference value voltage generated as a function of distance or travel by the reference value transmitter is connected in opposition to the actual voltage value generated by the tachometer generator. The voltage difference resulting therefrom is fed to the input of a regulator composed of an amplifier. At its output side the regulator is connected with an adjustment or control member constituted by a thyratron rectifier which controls the excitation current of the eddy current brake when a negative regulation deviation occurs. To improve the travel curve during the acceleration phase the asynchronous motors used in such drive controls as drive motors are equipped with a starter winding or coil. Thus, the drive motor as described, for example, in Swiss Pat. No. 437,698 may be designed as a pole-switchable drive motor having six or four poles and the start may be affected using the higher number of poles while a change to the smaller number of poles is affected when a predetermined velocity is reached.

In the drive control as described hereinbefore, the travel course is uncontrolled with the exception of the deceleration phase. No optimum results are achieved, therefore, with reference to the travel comfort which depends upon the jerk and acceleration values as well as with respect to travel time. A further disadvantage of this control is that the braking or stopping distances have to be smaller than the smallest storey distance which will result in too small rated travel speeds in consideration of the values for the deceleration which are still permitted.

In a drive control as initially described and as known, for example, from U.S. Pat. No. 2,958,796, granted Nov. 1, 1960 the asynchronous motor used as the drive motor is coupled to the elevator hoisting winch by an eddy current clutch as well as to the eddy current brake and to the tachometer generator. The excitation winding of the eddy current clutch is arranged in the operating circuit of a thyratron rectifier serving as an adjustment or control member for controlling the drive torque. The excitation winding of the eddy current brake is positioned in the operating circuit of a further thyratron rectifier serving as an adjustment or control member for controlling the braking torque. The control current circuit of the thyratron rectifiers are connected to the outputs of a regulator such that the excitation currents of the clutch and of the brake are controlled in opposition to each other. The regulator comprises an amplifier including a pentode and operates in such a manner that during the acceleration phase the drive torque is progressively controlled as a function of the positive regulation deviation and during the deceleration phase the brake torque is progressively controlled as a function of the negative regulation deviation. The reference value voltages generated by the reference value transmitter are tapped off at a capacitor, and the reference value for the acceleration is formed during charging of the capacitor and the reference value for the deceleration is formed during discharging of the capacitor.

The drive control as described hereinbefore contains certain disadvantages. Thus, the equipment costs, for example, are significantly increased and more space is required by virtue of the provision of the eddy current clutch. Also, the regulation by means of a time-dependent reference or set value during the deceleration phase no longer satisfies the requirements in respect of a precise direct stopping in modern day elevator systems. It is a further disadvantage that the driving torque as well as the braking torque are effective during the acceleration phase and the deceleration phase, whereby additional energy is consumed.

In another prior art drive control as known, for example, from German Pat. No. 2,340,930 the last-mentioned disadvantages are partially avoided. For controlling the driving torque, and as is known, the winding or coil of the drive motor directly coupled to the eddy current brake and to the tachometer generator is powered by an adjustment or control member composed of thyristors which are controllable by means of a firing angle control. The reference value generator generates a time-dependent increasing reference value voltage for the acceleration phase and a distance-dependent decreasing reference value voltage for the deceleration phase. The regulating circuit for the rotational speed of the drive motor comprises one respective regulator for at least two phases. The regulating circuit for the rotational speed of the eddy current brake comprises a further regulator, the output of which is directly connected to a control or adjustment member of the eddy current brake which comprises a controllable thyristor rectifier. The reference or set value voltage and the actual value voltage generated by the tachometer generator are supplied to the input side of all three regulators.

It is a disadvantage of the last-mentioned drive control that in an inertia-prone regulation path, as constituted by an eddy current brake, relatively large delays occur, whereby the stability of the regulating circuit decreases. Further disadvantages are that at least three regulators are required for regulating the rotational speed of the drive motor and the eddy current brake and that the provided reference value transmitter transmits a time-dependent reference or set value during the acceleration phase, so that no optimum total travel curve can be achieved.

SUMMARY OF THE INVENTION

Therefore, with the foregoing in mind it is a primary object of the present invention to provide a new and improved drive control for a transportation system, especially an elevator, which is not associated with the aforementioned limitations and drawbacks of the prior art drive controls.

Another and more specific object of the present invention aims at providing a drive control for a transportation system, especially an elevator, in which the dynamic behavior of at least the regulating circuit for the eddy current brake is improved.

Still a further significant object of the present invention is directed to a new and improved drive control for a transportation system, especially an elevator, in which both of the regulating circuits for the drive motor and for the eddy current brake are matched with respect to their static and dynamic behavior.

Another, further important object of the present invention is directed to a new and improved drive control for a transportation system, especially for an elevator, in which a common regulator may be employed for regulating the rotational speed of the drive motor as well as the eddy current brake.

Yet another important object of the present invention is directed to a new and improved drive control for a transportation system, especially for an elevator, in which a common regulator is employed for regulating the rotational speed of the drive motor and the eddy current brake, and wherein a reference or set value transmitter for generating optimum reference values is provided in order to achieve an optimum total travel curve.

Now in order to implement these and still further objects of the invention, which will become more readily apparent as the description proceeds, the drive control of the present development is manifested by features that, a current regulator or regulation circuit for regulating the excitation current of the eddy current brake is interposed in the regulator circuit for regulating the rotational speed of the eddy current brake, and the output magnitude or value of the first regulator is supplied as a reference or set value to a further or second regulator via a linearization element or member during the deceleration phase. During the acceleration phase the output magnitude or value of the first regulator is supplied to a matching or accommodation element which approximately matches the torque variation to the torque variation during the deceleration phase with respect to time, the output of the matching element being connected to the control or adjustment member of the drive motor via a further or second linearization member. The provided reference value transmitter generates a reference or set travel curve which is based upon optimum jerk or jolt magnitudes and acceleration magnitudes during the acceleration phase as well as during the deceleration phase.

The advantages achieved by the invention are essentially that delays are eliminated during regulation, particularly of the eddy current brake, so that the stability is improved. Also, by means of the suggested linearization elements or members and the matching element both of the regulating circuits are matched with respect to their static and dynamic behavior, so that a common regulator may be employed for both regulating circuits.

By linearizing the relationships between the regulator output and the output of the control system there is approximately obtained the characteristic of a d.c.-shunt motor. It is a further advantage that minimum total travel times can be achieved using the suggested reference or set value transmitter and while considering jerk and acceleration threshold values which still ensure for good travel comfort.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
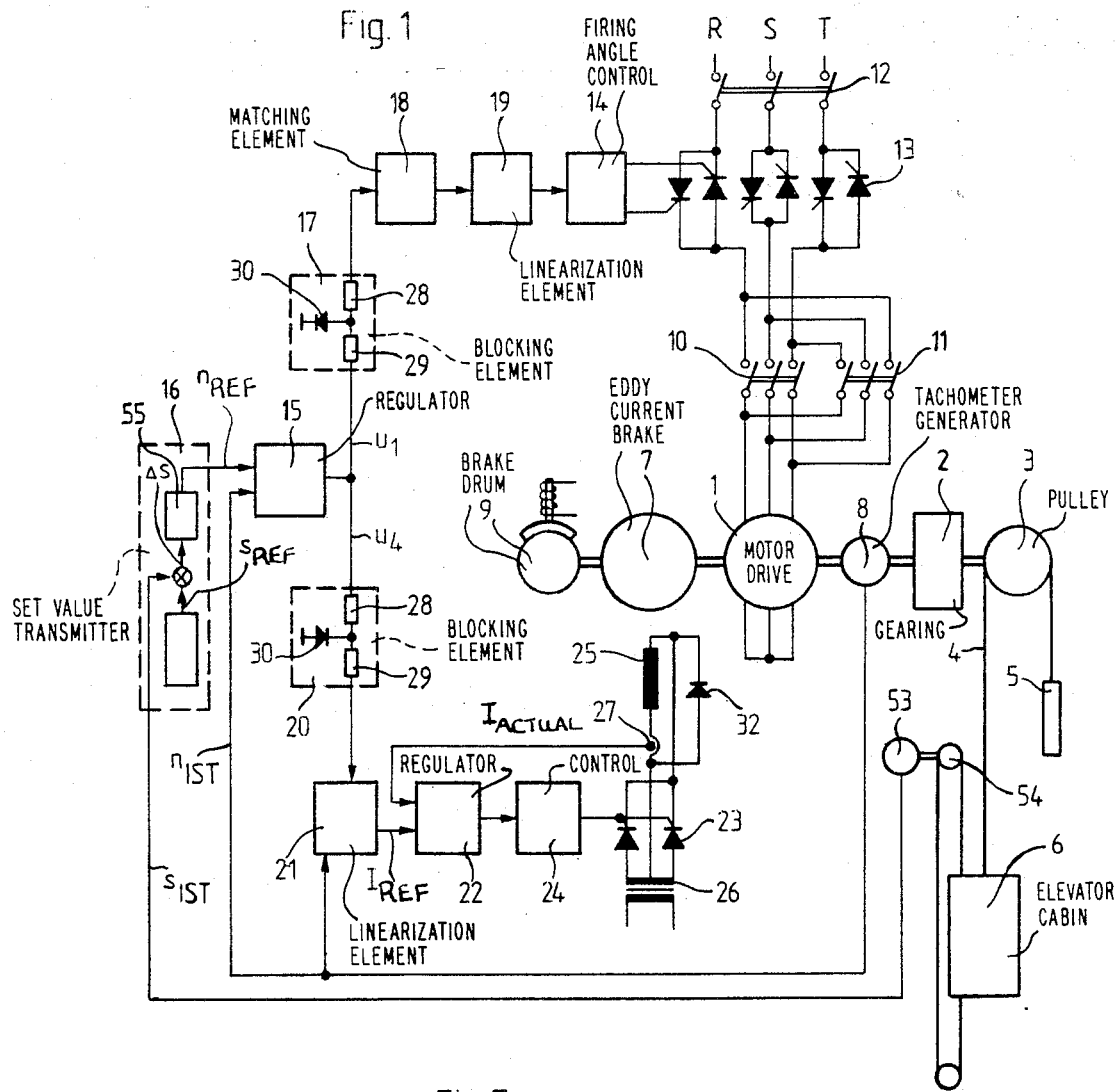
FIG. 1 is a schematic circuit diagram of the drive control according to the present invention.

Describing now the drawings, it is to be understood that only enough of the structure of the drive control has been shown as needed for those skilled in the art to readily understand the underlying principles and concepts of the present development, while simplifying the showing of the drawings. Turning attention now specifically to FIG. 1, there has been shown therein a circuit diagram of a drive control constructed according to the invention in which the drive or displacement motor of an elevator is designated by reference numeral 1. This drive motor 1 drives an elevator or lift cabin 6 which is balanced by a suitable counterweight 5. The elevator cabin 6 is suspended from a conveying cable or rope 4 and is in driving connection with the drive motor 1 by means of a transmission or gearing arrangement 2 and a drive pulley 3. The drive motor 1 may comprise, for example, an asynchronous motor which is drivingly coupled to an eddy current brake 7, to a tachometer generator 8 and to the brake drum 9 of an electromechanical holding brake. The drive motor 1 is connected to a three-phase mains or network RST via the contacts 10, 11 of a travel direction contactor or protection device and the contacts 12 of a main contactor or protection device. Thyristors 13 in back-to-back or inverse-parallel connection are arranged in each phase intermediate the contacts 10, 11 of the travel direction contactor and the contact 12 of the main contactor. The not particularly referenced control electrodes of the thyristors 13 are connected to the outputs of a firing angle control 14. The thyristors 13 and firing angle control 14 form a control or adjustment member of a regulating circuit for regulating the rotational speed of the drive motor 1.

The regulating circuit for regulating the rotational speed of the drive motor 1 comprises a regulator 15, the input side of which is connected to the output of a reference or set value transmitter 16 and to the tachometer generator 8 for inputting the reference or set value $n_{REF}$ and the actual value $n_{ACTUAL}$, respectively, of the rotational speed. The output of the regulator 15 is connected to the control or adjustment member 13, 14 of the drive motor 1 via a blocking element 17, a matching or accommodation element 18 and a linearization element or member 19.

Furthermore, the regulator 15 is associated with a regulation circuit for regulating the rotational speed of the eddy current brake 7 by connecting the output of the regulator 15 to a control or adjustment member 23, 24 of the eddy current brake 7 via a blocking element 20, a linearization element or member 21 and a regulator 22 which forms a two-step or two-point regulator. The control member 23, 24 of the eddy current brake 7 comprises two thyristors 23 and a trigger circuit 24 for generating firing or ignition pulses; the output of the trigger circuit 24 is appropriately connected to the control electrodes of the thyristors 23. The thyristors 23, an excitation winding 25 of the eddy current brake 7 and the secondary winding of a supply transformer 26 are interconnected by a center-point connection. As a result a pulsating d.c.-voltage $U_G$ will appear at the excitation winding 25 when an a.c.-voltage is applied to the primary winding of the supply transformer 26. A diode connected in parallel to the excitation winding 25 is designated by reference numeral 32 and enables current to flow through the excitation winding 25 when the thyristors 23 are blocked. The two-step or two-point regulator 22, the control or adjustment member 23, 24 and the excitation winding 25 form a control system or current regulating circuit which is interposed in the regulator circuit regulating the rotational speed of the eddy current brake 7. Thus, the output voltage of the first regulator 15 is supplied to the second regulator or two-step regulator 22 as a reference value $I_{REF}$ of the current, while the current flowing in the excitation winding 25 is supplied to the second regulator or two-step regulator 22 as an actual value $I_{ACTUAL}$ via a current converter 27.

The blocking elements 17, 20 each comprise a voltage divider formed by two resistors 28, 29 and a diode 30. In the first blocking element 17 the center tap of the voltage divider 28, 29 is connected to the anode of the related diode 30, while in the second blocking element 20 the center tap of the voltage divider 28, 29 is connected to the cathode of the related diode 30. As a consequence thereof, the regulation of the drive motor 1 is blocked when the output voltage $u_4$ of the first regulator 15 is positive, while the regulation of the eddy current brake 7 is blocked when the output voltage $u_1$ of the first regulator 15 is negative.

Figure 2:
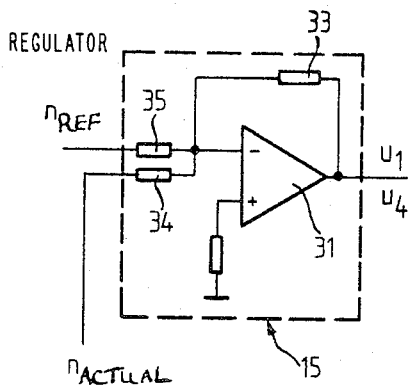
FIG. 2 is a circuit diagram of a regulator in the regulating circuit for the rotational speed and used in the drive control shown in FIG. 1.

In accordance with FIG. 2, the regulator 15 comprises an operational amplifier 31 including a feedback or feedback loop formed by a resistor 33 and affecting a proportional action or control. The inverting input of the operational amplifier 31 is connected via a resistor 34 to the tachometer generator 8, on the one hand, and via a further resister 35 to the output of the reference or set value generator 16, on the other hand. The output voltages $u_1$ and $u_4$ of the regulator 15 assume a course or pattern extending in the negative region and increasing towards zero during the acceleration phase, while the course or pattern thereof extends in the positive region and decreases towards zero during the deceleration phase as will be seen in FIGS. 5 and 6.

Figure 3:
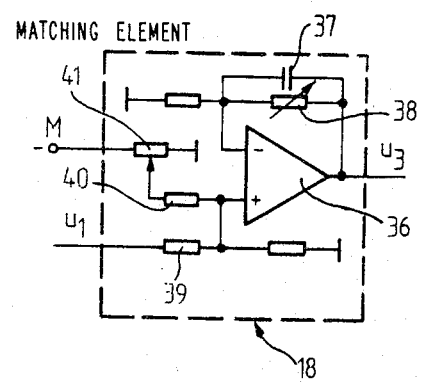
FIG. 3 is a circuit diagram of a matching or accommodation element of the regulating circuit for regulating the rotational speed of the drive motor and used in the drive control shown in FIG. 1.
Figure 4:
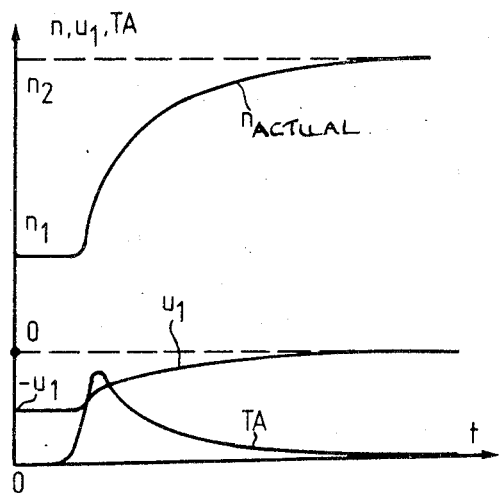
FIG. 4 is a diagram showing the output voltage $u_1$ of the regulator, the torque course or variation TA and the rotational speed course or variation $n_{ACTUAL}$ as a function of time for the drive motor during the acceleration phase using the drive control shown in FIG. 1 without the matching element shown in FIG. 3.
Figure 5:
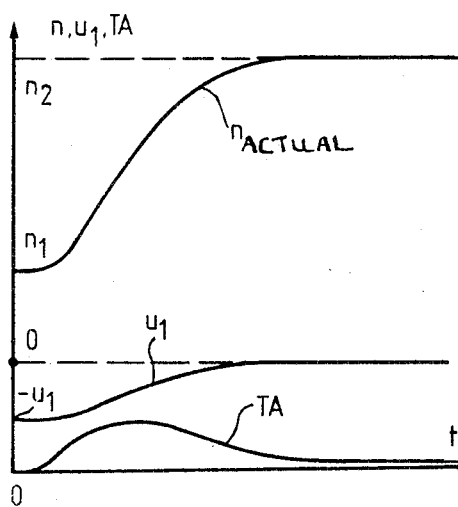
FIG. 5 is a diagram showing the output voltage $u_1$ of the regulator, the torque course or variation TA and the rotational speed course or variation $n_{ACTUAL}$ as a function of time for the drive motor during the acceleration phase using a drive control as shown in FIG. 1 and including the matching element shown in FIG. 3.
Figure 6:
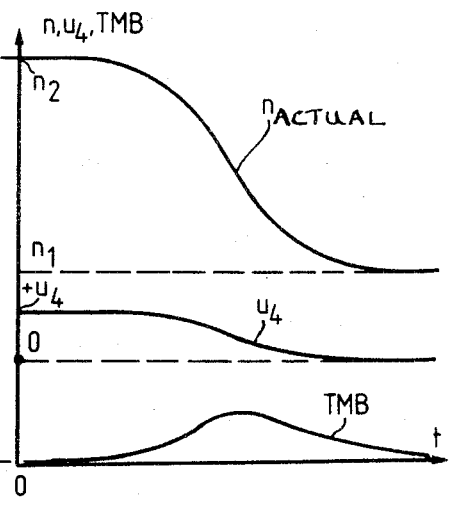
FIG. 6 is a diagram showing the output voltage $u_4$ of the regulator, the braking torque variation or course TMB and the rotational speed $n_{ACTUAL}$ as a function of time for the eddy current brake during the deceleration phase using the drive control shown in FIG. 1.

In accordance with FIG. 3 the accommodation or matching element 18 comprises an operational amplifier 36 including a feedback or feedback loop constituted by a timing member or element formed by a parallel connection of a capacitor 37 and a potentiometer 38. The non-inverting input of the operational amplifier 36 is connected to the output of the regulator 15 via a first resistor 39 and the blocking element 17 and is connected to the negative terminal M of a voltage source via a second resistor 40 and a potentiometer element 41. By adjusting the potentiometer 38 arranged in the feedback loop of the operational amplifier 36, the torque variation or course TA and the variation or course of the rotational speed $n_{ACTUAL}$ during the acceleration phase, as shown in FIG. 5, may be matched to the variation of the torque TMB and the rotational speed $n_{ACTUAL}$ during the deceleration phase, as shown in FIG. 6, so that a travel curve approaching an optimum travel curve is achievable. Without the matching or accommodation element 18 the course or pattern of the curve during the acceleration phase would deviate rather markedly from the course or pattern of the curve during the deceleration phase, as will be evident from FIG. 4. By means of the potentiometer element 41 which is connected to the non-inverting input of the operational amplifier 36, the output voltage $u_3$ of the matching element 18 may be adjusted in such a way that a good transition can be achieved from the acceleration phase to the deceleration phase with respect to the variation of the torques TA and TMB, respectively, and with respect to the rotational speeds $n_{ACTUAL}$, see FIGS. 5 and 6.

The linearization element or member 19 in the first regulating circuit of the drive motor 1 may form, for example, a functional network and is connected at the input side thereof to the output of the matching element 18 and on the output side thereof to the input of the control or adjustment members 13, 14 of the drive motor 1, see FIG. 1. The linearization member 19 linearizes the static relationship between the output voltage $u_1$ of the regulator 15 and the torque TA supplied by the drive motor 1 by forming a suitable function, whereby the characteristic of a d.c.-shunt motor can be achieved. The path amplification $\Delta TA/\Delta u_1$, furthermore, is approximately constant and independent of the position of the operation or working points as will be evident from FIG. 7, so that also the transient response will remain approximately constant and independent of variations in the reference or set values.

Figure 7:
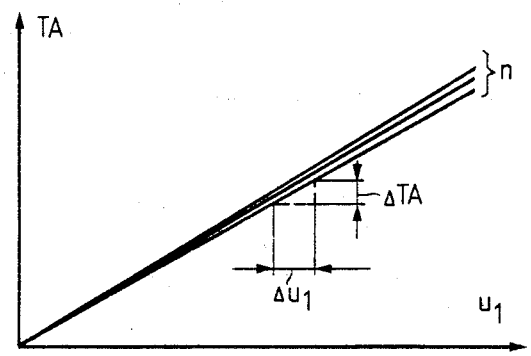
FIG. 7 is a diagram showing the torque variation or course TA of the drive motor as a function of the output voltage $u_1$ of the regulator using the drive control shown in FIG. 1 with a linearized control system and for the rotational speed n as parameter.
Figure 8:
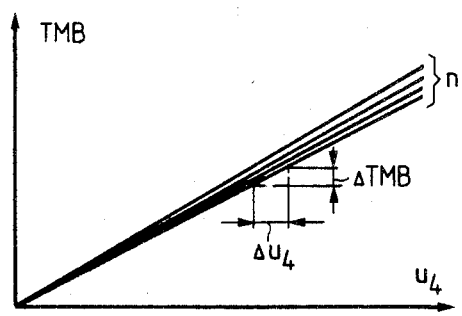
FIG. 8 is a diagram showing the braking torque variation or course TMB of the eddy current brake as a function of the output voltage $u_4$ of the regulator in the drive control shown in FIG. 1 with a linearized control system and for the rotational speed n as parameter.
Figure 9:
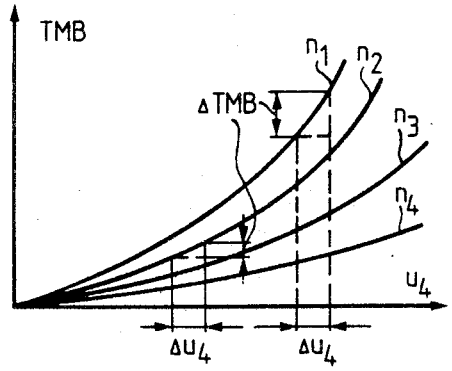
FIG. 9 is a diagram showing the braking torque variation or course TMB of the eddy current brake as a function of the output voltage $u_4$ of the regulator in the drive control shown in FIG. 1 using a non-linearized control system and for the rotational speed n as parameter.

The linearization member 21 in the regulating circuit of the eddy current brake 7 may be formed, for example, by a further or second functional network and is connected to the tachometer generator 8 by a first input thereof and to the output of the first regulator 15 via the blocking element 20 by means of a second input thereof, while the output of such linearization member 21 is connected to one input of the second regulator or two-step or two-point regulator 22 of the eddy current brake 7, see FIG. 1. The linearization member 21 linearizes the static relationship between the output voltage $u_4$ of the first regulator 15 and the braking torque TMB of the eddy current brake 7 by forming a suitable function, whereby the characteristics of a d.c.-shunt motor can be achieved. Furthermore, and similar to the first linearization member 19 in the regulating circuit of the drive motor 1 and as shown in FIG. 7, the path amplification $\Delta TMB/\Delta u_4$ is approximately constant and independent of the position of the operating or working points as will be evident from FIG. 8. In the absence of the linearization member 21 the path amplification would not be constant when the operating point is floating, so that the transient response also would become continuously variable, see FIG. 9.

Figure 10:
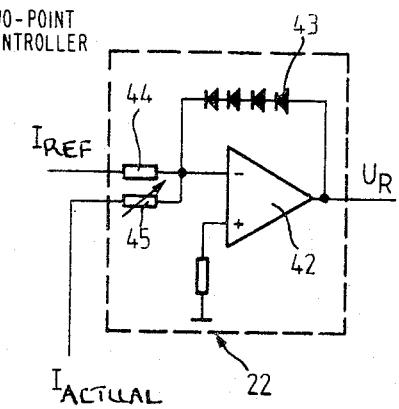
FIG. 10 is a circuit diagram of a two-point or two-step controller or regulator in a current regulating circuit interposed in the regulating circuit for regulating the rotational speed of the eddy current brake in the drive control shown in FIG. 1.

According to FIG. 10, the second regulator or two-step or two-point regulator 22 comprises an operational amplifier 42, the feedback or feedback loop of which is formed by a series connection of a number of diodes 43. The inverting input of the operational amplifier 42 is connected to the output of the regulator 15 via a resistor 44, the linearization element or member 21 and the blocking element 20, on the one hand, and to the current converter 27 via a potentiometer 45. The diodes 43 of the feedback loop cause the positive output voltage $U_R$ of the two-step regulator 22 to remain limited to the sum of the forward voltages of the diodes 43.

Figure 11:
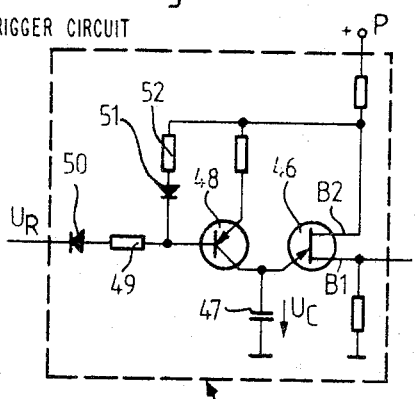
FIG. 11 is a circuit diagram showing the trigger circuit of the control or adjustment member in the current regulating circuit interposed in the regulating circuit for regulating the rotational speed of the eddy current brake in the drive control shown in FIG. 1.

As shown in FIG. 11, the trigger circuit 24 comprises a unijunction transistor 46, the emitter of which is connected to a capacitor 47 and to the collector of a transistor 48. The first base B1 of the unijunction transistor 46 is connected to the control electrodes of the thyristors 23. The second base B2 of the unijunction transistor 46 is connected to the positive terminal P of a voltage source. The base of the transistor 48 is connected to the output of the two-step regulator 22 via a resistor member 49 and a diode element 50, on the one hand, and to the positive terminal P of the voltage source by means of a further diode 51 and a further resistor 52, the emitter of the transistor 48 also being connected to the positive terminal P of the voltage source.

During the deceleration phase the two-step regulator 22 cooperates with the trigger circuit 24 as will now be described hereinafter.

Figure 12:
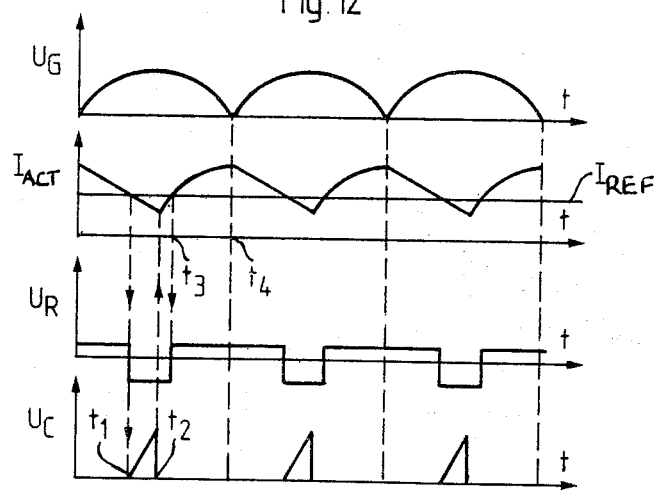
FIG. 12 is a diagram showing the voltage variation or course $U_G$ and the current variation or course $I_{ACTUAL}$ of the excitation winding of the eddy current brake, the output voltage $U_R$ of the two-step or two-point regulator and the capacitor voltage $U_C$ for triggering the firing or ignition pulses in the drive control shown in FIG. 1.

When the actual current value $I_{ACTUAL}$ in the excitation winding 25 of the eddy current brake 7 drops below the reference or set current value $I_{REF}$, the two-step regulator 22 is activated and the output voltage $U_R$ thereof abruptly assumes a negative value, see the moment of time $t_1$ in FIG. 12. Consequently, the diodes 50 and 51 as well as the transistor 48 in the trigger circuit 24 are rendered conductive, so that the capacitor 47 is charged. When the voltage $U_C$ of the capacitor 47 approaches the peak emitter voltage of the unijunction transistor 46, a pulse appears at the base B1 thereof by means of which the thyristor 23 respectively polarized in conducting direction is fired. The actual current value $I_{ACTUAL}$ thereupon starts to again increase and the capacitor 47 discharges via the unijunction transistor 46, see the moment of time $t_2$ in FIG. 12. When the current reference value $I_{REF}$ is reached, the output voltage $U_R$ of the two-step regulator 22 jumps back to the positive value as limited by the diodes 43 in the feedback loop, see moment of time $t_3$ in FIG. 12. When the applied d.c.-voltage $U_G$ drops to null, the fired thyristor 23 is blocked, so that the actual current value $I_{ACTUAL}$ again decreases, see moment of time $t_4$ in FIG. 12. In this manner the conductive period of the thyristors 23 is controlled as a function of the magnitude of the current reference value $I_{REF}$ such that there will result a mean actual current value $I_{ACTUAL}$ which follows the current reference value $I_{REF}$ and the braking torque in the eddy current brake 7 is correspondingly affected.

The reference or set value transmitter 16 which is preferably used is known, for example, from U.S. Pat. No. 4,337,847, granted July 6, 1982, and comprises a control storge in the form of a programmable ROM and three summing stages realized by a microprocessor. In the control storage, permitted jerk or jolt values as well as limiting values for the acceleration and the speed as well as for acceleration phase and deceleration phase, are stored. The acceleration, the speed and the distance are determined by numerical integration in the summing stages. As indicated schematically in FIG. 1, the distance or travel reference value $s_{REF}$ formed in this manner at the start of travel, is compared to an actual distance or travel value $s_{ACTUAL}$ generated by a digital tachometer 53 which preferably is driven via a speed limiter 54 by the elevator cabin 6. The regulation deviation $\Delta s$ resulting from the comparison is supplied as a reference value $n_{REF}$ for the rotational speed to the regulator 15 via a digital-to-analog converter 55. To initiate the deceleration phase, the reference value transmitter 16 cooperates with a start initiating or initiation device which is also known from the aforementioned U.S. Pat. No. 4,337,847. In this regard a target or destination distance associated with the respective selector position is compared to a possible target or destination distance generated in the start initiation device, wherein with equality of the distances and in the presence of a halt or stop determination there is initiated the stop and progressively increasing distance reference values $s_{REF}$ are generated as a function of the permitted negative jerk or jolt and acceleration values until the target or destination distance is reached.

Instead of the analog techniques employed in the embodiment of the drive control as described hereinbefore, digital techniques also may be used to realize the drive control, for example, by means of a microcomputer which may take over the functions of the regulators 15, 22, the blocking elements 17, 20, the matching element 18 and the linearization elements or members 19 and 21.

While there are shown and described present preferred embodiments of the invention, it is to be distinctly understood that the invention is not limited thereto, but may be otherwise variously embodied and practiced within the scope of the following claims. Accordingly,

What I claim is:

1. A drive control for a transportation system, especially for an elevator containing a drive motor coupled to an eddy current brake having an excitation winding and to a tachometer, said drive control comprising:
   a reference value transmitter;
   said reference value transmitter generating an increasing reference value during an acceleration phase and a decreasing reference value during a deceleration phase of said drive control;
   a first regulator operatively connected with said reference value transmitter and having an input and an output;
   said input being connected to said tachometer which supplies an actual value of the rotational speed of said drive motor to said first regulator;
   a first control member for controlling a driving torque of said drive motor;
   a first control circuit formed by said first regulator and said first control member;
   a second control member for controlling a braking torque of said eddy current brake;
   a second control circuit formed by said first regulator and said second control member;
   said output of said first regulator being connected to said first control member and to said second control member;
   a first blocking element for blocking the regulation of said drive motor;
   a matching element for approximately matching the variation in said driving torque and in the rotational speed of the drive motor during said acceleration phase to the variation of said driving torque and said rotational speed of the drive motor during said deceleration phase;
   a first linearization member;
   said first blocking element, said matching element and said first linearization member being operatively connected in said first control circuit;
   a second blocking element for blocking regulation of said eddy current brake;
   a second linearization member;
   a second regulator including a feedback loop for feeding back the current detected in said excitation winding of said eddy current brake to said second regulator;
   said second blocking element, said second linearization member and said second regulator being connected in said second control circuit;
   said first regulator being supplied with a regulation deviation determined by the difference of said reference value generated by said reference value transmitter and said actual value derived from said tachometer; and
   said travel of said elevator being automatically controlled as a function of said regulation deviation.

2. The drive control as defined in claim 1, wherein:
   said reference value transmitter has an output;
   said first regulator comprises a P-regulator;
   said P-regulator comprising an operational amplifier containing a feedback loop including a first resistor;
   a second resistor and a third resistor;
   said operational amplifier containing an inverting input connected to said output of said reference value transmitter via said second resistor and to said tachometer via said third resistor; and
   said operational amplifier containing an output connected to said first and said second control circuits.

3. The drive control as defined in claim 1, wherein:
   said first blocking element and said second blocking element each comprise a voltage divider, a diode having a cathode and an anode and a center tap;
   said center tap of said first blocking element is connected to said anode of its related diode;
   said center tap of said second blocking element is connected to said cathode of its related diode; and
   said eddy current brake is blocked from being regulated when said first regulator has a negative output voltage and said drive motor is blocked from being regulated when said first regulator has a positive output voltage.

4. The drive control as defined in claim 1, wherein:
   said second control circuit contains a current converter;
   said second regulator comprises a two-step regulator having an output and containing an operational amplifier;
   said operational amplifier containing a feedback loop including a series-connected circuit composed of at least one diode;
   a potentiometer and a resistor; and
   said operational amplifier further containing an inverting input connected to said current converter via said potentiometer and to an output of said second linearization member via said resistor.

5. The drive control as defined in claim 4, wherein:
   said second control member of said eddy current brake contains a trigger circuit;
   said trigger circuit comprising:
      a unijunction transistor including an emitter;
      a transistor including a base and a collector;
      a diode element, a resistor member and a capacitor;
      said base of said transistor being connected to said output of said two-step regulator via said resistor member and said diode element; and
      said collector of said transistor being connected to said emitter of said unijunction transistor and to said capacitor.

6. The drive control as defined in claim 1, wherein:
   said matching element comprises an operational amplifier;
   said operational amplifier containing a feedback loop comprising a capacitor and a potentiometer connected in parallel with respect to each other;
   a voltage source;

a first resistor and a second resistor and a potentiometer element; and said operational amplifier containing a non-inverting input connected to said output of said first regulator via a said first resistor and said first blocking element and to a negative terminal of said voltage source via said second resistor and said potentiometer element.

7. The drive control as defined in claim 1, wherein:

said reference value transmitter transmits a reference value for said rotational speed representing said regulation deviation determined as the difference of a distance reference value and an actual distance value; and said reference value transmitter generates reference difference values as a function of permitted jerk values and acceleration values during said acceleration phase as well as during said deceleration phase.

* * * * *